United States Patent [19]

Tsumuki et al.

[11] 4,438,555
[45] Mar. 27, 1984

[54] METHOD OF FIXING AN ANNULAR ELEMENT ON A SHAFT

[75] Inventors: Chiaki Tsumuki; Katsuhiko Ueda, both of Aichi; Hitoshi Nakamura, Toyota; Toshiyuki Nakura, Okazaki; Kazuhiko Tsuda, Toyota, all of Japan

[73] Assignee: Toyota Jidosha Kogyo Kabushiki Kaisha, Aichi, Japan

[21] Appl. No.: 356,347

[22] Filed: Mar. 9, 1982

[30] Foreign Application Priority Data

Sep. 22, 1980 [JP] Japan .................. 55-130587

[51] Int. Cl.$^3$ .................. B21D 39/00; B23P 11/00
[52] U.S. Cl. ..................... 29/505; 29/509; 403/274; 403/359; 403/375
[58] Field of Search ............ 29/505, 509, 515, 522 A, 29/525; 403/274, 359, 375, 380, 356, 358

[56] References Cited

U.S. PATENT DOCUMENTS

| 72,409 | 12/1867 | Mason | 403/359 |
|---|---|---|---|
| 250,219 | 11/1881 | Dodge | 29/505 |
| 515,954 | 3/1894 | Druen | 29/509 |
| 942,039 | 11/1909 | McClure | 29/505 UX |
| 1,157,666 | 10/1915 | Bennett | 403/359 X |
| 1,397,848 | 11/1921 | Wood et al. | 29/505 X |
| 1,562,396 | 11/1925 | Ward | 403/274 X |
| 1,815,517 | 7/1931 | Long | 29/509 UX |
| 2,164,547 | 7/1939 | Smith | 29/509 X |
| 3,619,882 | 11/1971 | Sobanski et al. | 403/359 X |
| 4,090,709 | 5/1978 | Fujii et al. | 29/505 X |

Primary Examiner—Charlie T. Moon
Attorney, Agent, or Firm—Parkhurst & Oliff

[57] ABSTRACT

The present invention relates to a method for fixing an annular element onto a shaft. The shaft may be a camshaft and the annular element may be a cam piece or a journal piece used in an automobile. The annular element is fixed onto the shaft by: engaging an axially extending projection of the element with an axially extending groove of the shaft so as to prevent a relative rotating motion; deforming an outer wall of the shaft adjacent to said groove at two positions near the terminating ends of the projection so that the outer wall protrudes into the groove, thereby fixing the element onto the shaft.

5 Claims, 7 Drawing Figures

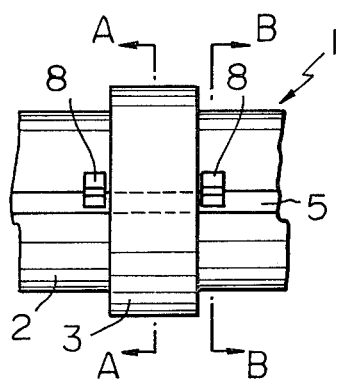
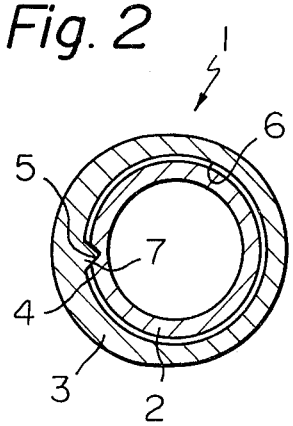
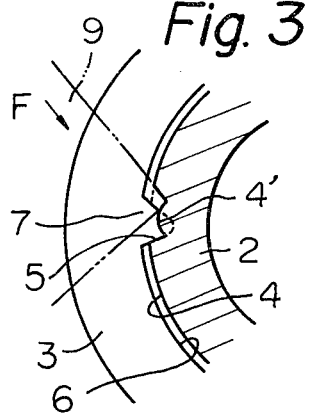
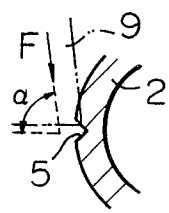
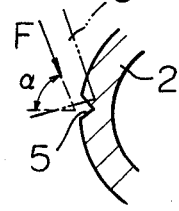
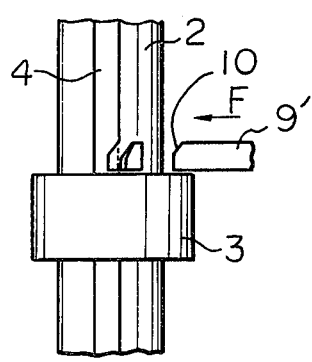
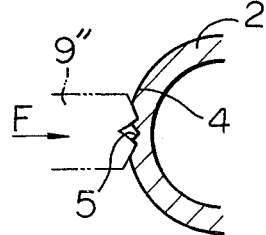

METHOD OF FIXING AN ANNULAR ELEMENT ON A SHAFT

BACKGROUND OF THE INVENTION

The present invention relates to a method for fixing an annular element onto a shaft and a shaft assembly obtained by such method. The shaft may be, for example, a camshaft and the annular element may be, for example, a cam piece or a journal piece used in an automobile.

In automobiles, many camshafts are produced by means of sintering, in which, at first, a preliminarily sintered cam piece or journal piece is fixed onto a shaft temporarily before being permanently fixed as a result of the completion of sintering. In such an operation, it is necessary that the temporarily fixed cam piece be anchored to the shaft so that it is not displaced relative to the shaft either in the axial direction or in the rotating direction. For this purpose, conventional assembling of a camshaft assembly of the above-described type has been carried out according to the following method comprising the steps of: forming an axially extending groove on an outer wall of the shaft and forming an axially extending projection on an inner surface of a through hole of the piece, the groove and projection having respective cross sections which enable them to fit tightly together; inserting the shaft into the through hole of the piece while engaging the projection tightly with the groove, thereby securing the piece to the shaft temporarily before permanently fixing it onto the shaft as a result of completion of sintering.

However, the above method is disadvantageous in that there is an unavoidable dimensional variance between the groove and the projection. If the variance is large, the projection is loosely fitted to the groove, resulting in a reduction of holding capacity between the two elements; on the other hand, if the projection is fitted too tightly to the groove, breakage of the projection and groove results.

SUMMARY OF THE INVENTION

It is an object of the present invention to provide a method for fixing an annular element onto a shaft and thereby solve the above-mentioned problems by easier operation.

Another object of the present invention is to provide a shaft assembly obtained by such method, which assembly is conveniently utilized especially in the case where it is necessary to fix an annular element onto a shaft temporarily before permanently fixing said annular element onto the shaft by sintering or brazing.

One object is attained by a method for fixing an annular element onto a shaft, said element having a through hole into which said shaft is loosely inserted, according to the present invention, said method comprising the steps of: forming an axially extending groove on an outer wall of said shaft and forming an axially extending projection on an inner surface of said hole of said element over the whole length thereof, said groove and said projection having respective cross sections which enable them to fit loosely together; inserting said shaft into said hole while engaging said projection with said groove so as to prevent a relative rotating motion; and after determining the axial position of said element relative to said shaft, deforming said outer wall of said shaft adjacent to said groove at two positions near the terminating ends of said projection so that said outer wall protrudes into said groove, thereby fixing said element onto said shaft.

Another object of the present invention is attained by a shaft assembly comprising a shaft and an annular element fixed onto said shaft, said element having a through hole into which said shaft is inserted, wherein said shaft has an axially extending groove on an outer wall of said shaft and said element has an axially extending projection on an inner surface of said hole of said element over the whole length thereof, said groove and said projection having respective cross sections enabling them to be loosely fitted to each other, and the outer wall of said shaft adjacent to said groove is deformed at two positions near the terminating ends of said projection so that said outer wall protrudes into said groove with said shaft being inserted into said hole of said element.

The present invention will now be described in greater detail with reference to the accompanying drawings which illustrate the preferred embodiments of the invention, in which:

FIG. 1 shows a top view of a preferred embodiment of a camshaft assembly, according to the present invention;

FIG. 2 shows a section taken along the line A—A in FIG. 1;

FIG. 3 shows an enlarged partial section taken along the line B—B in FIG. 1;

FIGS. 4a and 4b show schematically how a tool is pressed to cause an outer wall surrounding a groove of a shaft to be deform at different angles;

FIG. 5 shows a schematic top view in which a tool having a bevelled edge is used to deform the outer wall of the shaft adjacent to the groove; and FIG. 6 shows a schematic view in which a tool having a V-shaped edge is used to deform the outer wall of the shaft adjacent to the groove.

DESCRIPTION OF A PREFERRED EMBODIMENT

Referring to FIGS. 1 and 2, a shaft assembly 1 is shown which can be applied to a camshaft assembly in an internal combustion engine though it is not limited to a camshaft. In the camshaft assembly production process, a shaft 2 is made of a hollow pipe, onto which an annular element 3, for example, a cam piece or a journal piece, is fixed. Such annular piece 3 is made by sintering. At first, it is compacted in the mold and preliminarily sintered; then it is assembled onto the shaft 2 before completion of sintering and the above assembly is finally sintered so that the piece 3 is fixed onto the shaft 2 permanently.

On the cylindrical outer wall 4 of the shaft 2 there is formed a groove 5 with a triangular cross section which extends axially parallel to the axis of the shaft 2. The annular element 3 has a hole 6 through which the shaft 2 is inserted. Between the outer wall 4 of the shaft 2 and the inner surface of the hole 6 of the annular element 3 there is a certain clearance for loose fitting of the two elements 2 and 3. Further, on the inner surface of the hole 6 of the annular element 3 there is formed an axially extending projection 7 integral with the element 3 over the whole length thereof, a cross section of which projection substantially corresponds to that of the groove 5. The groove 5 and projection 7 are formed with such a tolerance that they can fit loosely when the shaft 2 is inserted into the hole 6 of the annular element 3 since it is not necessary that they fit tightly as in the conventional case.

The shaft 2 is inserted into the hole 6 of the annular element 3 while engaging the projection 7 with the groove 5, thereby preventing a relative rotating motion between the annular element 3 and the shaft 2. After determining the axial position of the annular element 3 with respect to the shaft 2, the two elements 2 and 3 are held by a suitable holding tool (not shown). In this state, the outer wall 4 adjacent to the groove 5 is deformed at two positions represented by the numeral 8 in FIG. 1, these two positions 8 being located near the terminating ends of the axially extending projection 7.

FIG. 3 shows a camshaft assembly 1 in which the above-described deformation is caused by a tool 9 which presses the outer wall 4 of the shaft 2 in a direction perpendicular to the axially extending groove 5 as shown by the arrow. The initial shape (shown by the broken line) of the outer wall 4 surrounding the groove 5 is deformed so that said outer wall protrudes into the groove 4, as shown by the numeral 4', and protrudes toward the end of the axially extending projection 7 at both sides of the annular element 3 so that the relative axial movement of the element 3 and the shaft 2 is obstructed, that is, the element 3 is fixed onto the shaft 2. Then the elements of the camshaft assembly 1 are permanently joined to each other by means of a suitable process such as final sintering, brazing, or any other operation.

On effecting such deformation of the outer wall 4 of the shaft 2, the tool 9 presses the outer wall 4 at an angle $\alpha$ with respect the normal line at the groove center. If the angle $\alpha$ is large, as shown in FIG. 4a, the force F may be small, but a part of the wall may be removed by shearing. If the angle $\alpha$ is small, as shown in FIG. 4b, a great force F is needed to deform the outer wall, and the tool life is decreased. The present invention proposes a tool which is used in the above-described operation. One example of the tool 9 is shown in FIG. 5, in which the tool 9' has a bevelled edge 10. With the aid of this tool 9', as shown in FIG. 5, deformation is effected by applying a small force F without shearing of the wall.

In FIG. 6, the tool 9'' has a V-shaped edge, by which the outer wall 4 is deformed to protrude into the groove 5 on both sides of the groove 5.

In the illustrated embodiments, cross sections of the groove 5 and the projection 7 are triangular cross sections corresponding to each other. However, they can be cross sections of various shapes which enable the projection and the groove to engage with each other so as to prevent a relative rotating motion.

We claim:

1. Method for fixing an annular element onto a shaft, said element having a through hole into which said shaft is loosely inserted, said method comprising the steps of: forming an axially extending groove on an outer wall of said shaft and forming an axially extending projection on an inner surface of said hole of said element over the whole length thereof, said groove and said projection having respective cross sections being adapted so as to loosely fit together; inserting said shaft into said hole while engaging said projection with said groove so as to prevent a relative rotating motion; and after determining the axial position of said element relative to said shaft, deforming said outer wall of said shaft adjacent to said groove at two positions near the terminating ends of said projection so that said outer wall protrudes into said groove, thereby fixing said element onto said shaft.

2. Method according to claim 1, wherein said outer wall is deformed on one side of said groove.

3. Method according to claim 2, wherein a tool having a bevelled edge is used.

4. Method according to claim 1, wherein said outer wall is deformed on both sides of said groove.

5. Method according to claim 4, wherein a tool having a V-shaped edge is used.

* * * * *